US006379414B1

United States Patent
Kleine-Kleffmann et al.

(10) Patent No.: US 6,379,414 B1
(45) Date of Patent: Apr. 30, 2002

(54) PROCESS FOR PRODUCING PRESSED FERTILIZER GRANULATES

(75) Inventors: Ulrich Kleine-Kleffmann, Bad Hersfeld; Ludger Waldmann, Friedewald; Frank Wolf, Schenklengsfeld, all of (DE)

(73) Assignee: Kali und Salz GmbH, Kassel (DE)

( * ) Notice: Subject to any disclaimer, the term of this patent is extended or adjusted under 35 U.S.C. 154(b) by 0 days.

(21) Appl. No.: 09/559,845

(22) Filed: Apr. 27, 2000

(30) Foreign Application Priority Data

Apr. 28, 1999 (DE) .................................. 199 19 233

(51) Int. Cl.⁷ ............................. C05D 1/02; C05D 5/00
(52) U.S. Cl. ........................ 71/61; 71/63; 71/64.03; 71/31
(58) Field of Search .................. 71/61, 63, 64.03, 71/31

(56) References Cited

U.S. PATENT DOCUMENTS

| | | | | |
|---|---|---|---|---|
| 2,599,436 A | | 6/1952 | Dancy ............................. 99/2 |
| 3,617,237 A | * | 11/1971 | Nagasawa et al. ............ 71/24 |
| 3,926,609 A | * | 12/1975 | Effmert et al. ................ 71/31 |
| 4,101,637 A | * | 7/1978 | Bierman et al. ............. 423/309 |
| 4,248,617 A | * | 2/1981 | Kamo et al. .................... 71/42 |
| 4,410,350 A | * | 10/1983 | Judd .............................. 71/63 |
| 4,946,654 A | * | 8/1990 | Uhlemann et al. .......... 422/140 |
| 5,264,017 A | * | 11/1993 | Van de Walle ................ 71/61 |
| 5,698,007 A | * | 12/1997 | Schmitt ........................ 75/772 |
| 5,743,934 A | * | 4/1998 | Wommack et al. ............ 71/28 |
| 5,782,951 A | * | 7/1998 | Aylen et al. ................... 71/28 |
| 6,071,325 A | * | 6/2000 | Schmitt ........................ 75/321 |

FOREIGN PATENT DOCUMENTS

| | | | |
|---|---|---|---|
| DE | 3304303 | * | 8/1984 |
| JP | 01157489 | * | 6/1989 |
| SU | 768450 | * | 10/1980 |

OTHER PUBLICATIONS

Ullmanns's Encyclopedia of Technical Chemistry, 4$^{th}$ ed., vol. 13, p. 471; Verlag Chemie, Weinheim.

* cited by examiner

Primary Examiner—Chhaya D. Sayala
(74) Attorney, Agent, or Firm—Collard & Roe, P.C.

(57) ABSTRACT

A process is for the production of potash fertilizer granulates which have a stable shelf life also at high relative air humidities. This granulate contains an additive in the form of magnesium oxide and/or calcium oxide in a fine powder form, which is added by metering in prior to the compacting step. The result is a high final bursting strength even if the granulate is stored in a wet climate.

6 Claims, No Drawings

PROCESS FOR PRODUCING PRESSED FERTILIZER GRANULATES

BACKGROUND OF THE INVENTION

1. Field of the Invention

The present invention relates to the compacting of potash salt for the production of fertilizer granulates, and in particular of potassium chloride. These potash salts were obtained by treating raw mixtures or single salts by way of crystallization or flotation.

2. The Prior Art

Potash salt granulates are usually produced by build-up and press granulation. In the build-up granulation process, moist salt from the dehydration stage is mixed with dry salt of the finest type (re-circulated dust) as well as auxiliary granulating agents, and adjusted with water or off-lye to the required granulating moisture. The salt is subsequently compacted in drums to produce round granules. The "green" granules so obtained are subsequently dried.

In the press granulating process, fine product that has already been dried is pressed on presses (e.g. roll presses) into the shape of so-called "barnacles" or shells with a thickness of a few millimeters. These shells are thereafter subjected to a grinding and screening process. The coarse screening product is the finished product, whereas the undersized grain is re-circulated (Ullmann's Encyclopedia of Technical Chemistry, 4th edition, volume 13, page 471; Verlag Chemie, Weinheim). No auxiliary granulating agents are added during compacting. The resulting pressed granulates are solid and have a stable shelf life at the normal medium humidity values which are found at median latitudes.

At high relative air humidity values which are found, for example in tropical countries, it is found that the pressed granulate exhibits increased water absorption. This may furthermore lead to decomposition of the grain, to an increase in the amount of the fine component, and to hardening of the product.

Decomposition phenomena which may be occurring, for example in connection with salt lick stones for animal fodder can occur under the influence of the weather outdoors. These problems are dealt with according to U.S. Pat. No. 2,599,436, among others, as follows. The salt component, which is sodium chloride, as a rule, is mixed with components of up to 6% MgO as well as up to 12.5% of an about 20% $MgCl_2$ solution, and then hardened in molds.

Such a procedure is not possible in connection with the press granulation of potash fertilizer salts because such compacting is a dry process in which the compacting pressure plays the decisive role for the strength of the granulates. Furthermore, the required chemical quality of the fertilizer granulates would be impaired in an impermissible manner.

SUMMARY OF THE INVENTION

It is an object of the present invention to produce a pressed granulate which is solid and stable also under extreme climatic conditions such as high relative air humidity values and elevated outside temperatures, and which will not decompose even when stored over longer periods of time. At the same time, the required chemical quality of the salt to be granulated is not to be impaired.

It has now been found that the water absorption of a pressed granulate, for example of a 60-type potash salt fertilizer, from the ambient moist air can be suppressed. This suppression occurs if small amounts of magnesium oxide in the form of powder are added to the dry fine salt to be granulated. A dry mixture is then produced, which is then processed into granules according to known compacting methods.

It has been found, furthermore, that the compacted granulate produced in this way has a final bursting strength even under elevated air humidity values and temperatures that is a higher bursting strength than the one of a comparably pressed granulate not treated as defined by the invention. The effect can be observed also after longer storage periods at high relative humidities. The product remains granular and stable.

The positive effect can be observed in connection with all commercially available MgO-specifications.

In a preferred embodiment of the process of the invention, fine salt to be granulated such as a fine, dry KCl-crystallizate is obtained in a dissolution process or a flotation process. It is mixed with finely ground magnesium oxide, and the mixture is then pressed into the shape of barnacles (or shells) with application of the usual compacting pressures, for example on a roll press. These barnacles are subsequently ground and processed into granulate with the required grain size by the usual circulation processing procedure including classifying and separating. According to the invention, contents of 0.2 to 2 percent, by weight, preferably 1 to 1.5 percent by weight of dry MgO powder based on the dry amount of granulate are metered into the granulate. Higher contents lead to an insignificant improvement in the result which, however, bears no comparison with the attendant reduction in the content of valuable material in the final granulate.

The positive effect of the invention is developed in the same way if prior to the pressing step, preferably burnt lime in the form of powder, or burnt dolomite (CaO/MgO) are metered into the calcium oxide components. They are present in small amounts according to the invention. The process is not limited to the compacting of potassium chloride, but applicable for other potash salt fertilizers as well, for example also for potassium sulfate.

DETAILED DESCRIPTION OF PREFERRED EMBODIMENT

The present invention is further illustrated by reference to the following examples which are not to be deemed limitative of the invention in any manner thereof.

EXAMPLE 1

A commercially available magnesium oxide powder is metered prior to the compacting step on a roll press into a dry 60-type fine floatation salt. The amount of MgO is such that a content of 1.3% MgO by weight based on the total weight of finished granulate is produced in the continuous process of circulation granulation with screen separation. The MgO-quantity is evenly distributed upstream and downstream of the press by mixing processes in the aggregates.

The granulate so obtained is now stored and the absorption of moisture and the bursting strength are measured in the course of storage. The following results were obtained as compared to a granulate produced without the addition of MgO under the same conditions and are presented in Table 1.

TABLE 1

Plant Test:

| Added substance: | | Without | MgO |
|---|---|---|---|
| Amount added: | | — | 1.3% |
| | Start | 0.1 | 0.1 |
| Moisture absorption[1], after | | | |
| Moisture absorption[1], after | 1 d | 2.5 | 1.0 |
| Moisture absorption[1], after | 2 d | 2.9 | 1.1 |
| Moisture absorption[1], after | 4 d | 3.4 | 1.2 |
| Moisture absorption[1], after | 8 d | 3.7 | 1.4 |
| Bursting strength[2] | Start | 51 | 55 |
| Bursting strength[2] | 1 d | 27 | 55 |
| Bursting strength[2] | 2 d | 25 | 46 |
| Bursting strength[2] | 4 d | 24 | 47 |
| Bursting strength[2] | 8 d | 21 | 40 |

[1]Weight increase in % during storage at 20° C., 70% rel. air humidity.
[2]Bursting strength in N/grain (fraction 2.5–3 mm)

The comparison of the measured values shows the improved results as defined by the present invention as the storage duration time in days (d) increases. Namely there is nearly a constant absorption of moisture in the granulate with MgO, versus the strongly rising absorption of moisture in the comparative granulate without MgO. The improved results as defined by the invention with respect to the development of the bursting strength is reproduced in the same way. The relatively high starting bursting strength remains intact with the granulate with MgO also after longer storage time in days, whereas a very large decrease in the bursting strength is seen with the comparative granulate without MgO.

EXAMPLE 2

The following Table 2 shows a comparison of the results produced by the present invention of a 60-type KCl-fine salt with MgO compacted under laboratory conditions, as well as of a compacted 60-type KCl-fine salt with CaO, with the MgO and CaO components each amounting to 1.5% by weight based upon the granulate total weight. This was compared to a granulate without this addition.

TABLE 2

Laboratory Test:

| | | Added substance: | | |
|---|---|---|---|---|
| | | Without | CaO 1.5% | MgO 1.5% |
| Moisture absorption[1] | Start | — | — | — |
| After | 1 d | 2.3 | 1.0 | 1.4 |
| | 2 d | 3.1 | 1.2 | 1.4 |
| | 4 d | 4.1 | 1.3 | 1.5 |
| | 8 d | 5.2 | 1.3 | 1.5 |

TABLE 2-continued

Laboratory Test:

| | | Added substance: | | |
|---|---|---|---|---|
| | | Without | CaO 1.5% | MgO 1.5% |
| Bursting strength[2] | Start | 35 | 53 | 45 |
| | 1 d | 18 | 40 | 43 |
| | 2 d | 19 | 49 | 31 |
| | 4 d | 8 | 34 | 41 |
| | 8 d | 14 | 42 | 37 |

[1]Weight increase in % during storage at 20° C., 70% relative air humidity.
[2]Bursting strength in N/grain (fraction 2.5–3 mm)

The improved results as defined by the present invention is reproduced in the same way as according to Example 1. Specifically, it has to be noted that there is no significant difference between the positive effects of CaO and MgO. The time is in days (d).

While a few embodiments of the present invention have been shown and described, it is to be understood that many changes and modifications may be made thereunto without departing from the spirit and scope of the invention as defined in the appended claims.

What is claimed is:

1. A process for producing humidity resistant pressed granules of potash fertilizer comprising (a) mixing dry fine potash salt and an additive powder selected from the group consisting of dry finely, ground magnesium oxide, calcium oxide and a mixture of MgO and CaO, to form a dry mixture;

(b) pressing this dry mixture into the shape of barnacles pressed product; and (c) processing this pressed product into granules.

2. The process according to claim 1, comprising metering in the additive powder uniformly into the fine salt prior to pressing and producing a homogeneous mixture.

3. The process according to claim 1, comprising adding the additive by metering in a total amount of from 0.2% by weight based on the dry total weight of the granulate.

4. The process according to claim 1, comprising adding the additive by metering in a total amount of from 1% to 1.5% by weight based upon the total weight of the granulate.

5. The process according to claim 1, wherein the calcium oxide additive powder is burnt lime.

6. The process according to claim 1, wherein the mixture of CaO and MgO additive powder is burnt dolomite.

* * * * *